United States Patent [19]
Macri et al.

[11] Patent Number: 6,154,828
[45] Date of Patent: *Nov. 28, 2000

[54] METHOD AND APPARATUS FOR EMPLOYING A CYCLE BIT PARALLEL EXECUTING INSTRUCTIONS

[75] Inventors: Joseph Dominic Macri, Boston; Francis X. McKeen, Westborough; Joel S. Emer, Acton; William Robert Grundmann, Hudson; Robert P. Nix, Concord; David Arthur James Webb, Jr., Groton, all of Mass.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/072,632

[22] Filed: Jun. 3, 1993

[51] Int. Cl.$^7$ ........................................ G06F 9/38
[52] U.S. Cl. ................................ 712/24; 712/23
[58] Field of Search ........................ 395/650, 375, 395/DIG. 1, DIG. 2; 364/948.3, 946.3, 946.2; 712/23, 24, 215, 216, 217, 236, 238, 208, 210, 226

[56] References Cited

U.S. PATENT DOCUMENTS

| | | | |
|---|---|---|---|
| 4,829,422 | 5/1989 | Morton et al. | 395/650 |
| 4,833,599 | 5/1989 | Colwell et al. | 364/200 |
| 5,051,940 | 9/1991 | Vassiliadis et al. | 395/736 |
| 5,073,855 | 12/1991 | Staplin et al. | 395/375 |
| 5,185,872 | 2/1993 | Arnold et al. | 395/375 |
| 5,197,135 | 3/1993 | Eickemeyer et al. | 712/217 |
| 5,203,002 | 4/1993 | Wetzel | 395/800 |
| 5,295,249 | 3/1994 | Blaner et al. | 395/375 |
| 5,303,356 | 4/1994 | Vassiliadis et al. | 712/238 |
| 5,337,415 | 8/1994 | DeLano et al. | 395/375 |
| 5,355,460 | 10/1994 | Eickemeyer et al. | 395/375 |
| 5,371,862 | 12/1994 | Suzuki et al. | 712/234 |
| 5,398,321 | 3/1995 | Jeremiah | 395/375 |
| 5,448,746 | 9/1995 | Eickemeyer et al. | 712/210 |
| 5,465,377 | 11/1995 | Blaner et al. | 712/23 |
| 5,502,826 | 3/1996 | Vassiliadis et al. | 395/375 |
| 5,504,732 | 4/1996 | Vassiliadis et al. | 395/800 |

OTHER PUBLICATIONS

Acosta et al, an Instruction Issuing Approach to Enhancing Performance in Multiple Functional Unit Processors, IEEE Trans. on Coup. vol. C–35, No. 9, Sep. 1986.

Kondoh et al, Parallel Processing of Finely Grained Tasks: Arbitrating Synchrounizer & Parallel Scheduler, Indust. Elect. Ctrl & Instrum., 1991 Intl. Conf. pp. 1425–1430.

Smith, Dynamic Instruction Scheduling and the Astronautics ZS–1, Computer Magazine, Jul. 1989, vol. 22 Issue 7 pp. 21–35.

Minagawa et al, Pre–Decoding Mechanism for Superscalar Architec. Communications, Computers & Signal Processing, 1991, pp. 21–24.

Smith, Dynamic Instruction Scheduling and the Astronautics ZS–1, IEEE Jul. 1989.

Torng et al, on Instruction Windowing for Fine—Grain Parallelism in High Performance Processors, IEEE Mar. 1993.

"A VLIW Architecture for a Trace Scheduling Compiler", by Robert P. Colwell, Robert P. Nix, John J. O'Donnell, David B. Papworth, Conference on Architectural Support for Programming Languages and Operating Systems, Published October 1987.

*Primary Examiner*—Majid A. Banankhah
*Attorney, Agent, or Firm*—Hamilton, Brook, Smith & Reynolds, P.C.

[57] ABSTRACT

A method and apparatus including means for storing an executable file which includes a group of bits which define functional operations and cycle bits associated with each functional operation and means for completing a variable number of the functional operations in parallel during a single execution cycle in accordance with a state of the associated cycle bit. The method and apparatus eliminates the need for complex data dependency checking hardware and allows a minimum amount of control logic to complete execution of executable files. The method and apparatus further minimizes the necessity of adding null operations (NOPs) to executable files which reduces the amount of storage space necessary to store the executable files and allows executable files to be used on multiple hardware implementations and for register values to be used for multiple purposes during single execution cycles.

26 Claims, 4 Drawing Sheets

FIG. 1

FIG. 2
PORTION OF A DAG

FIG. 2a

ADD R0,R1,R1
ADD R1, R2,R3

CYCLE BIT
1

METHOD AND APPARATUS FOR EMPLOYING A CYCLE BIT PARALLEL EXECUTING INSTRUCTIONS

BACKGROUND OF THE INVENTION

This invention relates generally to computer systems, and more particularly to parallel processing of functional operations in computer systems.

As it is known in the art, computer systems generally include at least one central processing unit (CPU), a main memory, and a system bus coupling the main memory to the CPU. Often the computer system is controlled through an operating system software program and the computer system will also generally include a compiler program to translate a user program, typically written in a high-level programming language, into a machine-language program. The machine language program is an executable file of instructions which the CPU is capable of executing. The operating system typically stores the executable file which contains instructions in main memory where the CPU may access it via the system bus.

The CPU generally includes a processor chip and retrieving logic. The processor directs the retrieving logic to retrieve instructions from executable files in main memory. An instruction cache memory (I-cache) may also be resident on the CPU and may be used by the retrieving logic to temporarily store instructions prior to and after their execution. The processor also directs control logic on the CPU to unload instructions from the I-cache and execute them.

An instruction is a group of bits partitioned into an operational code (i.e., op-code) which defines an operation or multiple operations for the control logic of the processor to execute. The operational code further provides addresses of registers which contain the operands of the operation (i.e., data inputs to be used during execution of the operation) and the address of a register to be used to store the result of the operation. The operations specified by the op-code include functional operations (i.e., add, subtract, multiply, shift, complement, etc.) or null operations (i.e., NOP).

In the past, CPUs were capable of executing only one operation per processor clock cycle. Therefore, the compiler program translated the user program into an executable file of instructions each of which included only a single operation. Thus, the processor executed the operations serially (i.e., one operation at a time).

In order to increase the performance of the computer system, CPUs were developed which included processors and control logic capable of executing a predetermined number of operations simultaneously (i.e., the predetermined number of operations would be executed during a single processor clock cycle). Thus, the CPU executes the predetermined number of operations in parallel (i.e., parallel processing).

One problem with executing operations in parallel is that values (i.e., operands) used by the hardware to complete operations may not be available when instructions are executed in parallel. For example, if a first operation provides a result and stores the result in a register X and a second operation needs the result of the first operation stored in register X, these two operations may not be issued in parallel. This situation is an example of a so called data precedence or dependency constraint. That is, here the second operation requires the results of the first operation, and thus, they can not be issued in parallel with the first operation. Other data precedence or dependency constraints include latencies or delays associated with the results of one operation which are necessary to another operation, and limited resources which require one operation to be scheduled in a subsequent instruction. Thus, all of the operations which make up a user program may not be executed in parallel due to data precedence constraints.

In a multiple instruction issue computer system, generally either software (i.e., a compiler program) or hardware (i.e., control logic) is used to determine which functional operations may be executed in parallel. An example of a system which uses software is a Very Long Instruction Word (VLIW) parallel processing computer system. The compiler program of a VLIW computer system determines which functional operations may be executed in parallel while translating the user program into an executable file. When providing and storing the executable file in main memory, if the compiler determines that it is necessary for an instruction to include less than the predetermined number of functional operations due to data precedence constraints of a particular functional operation, a null operation (i.e., NOP) is substituted for the particular functional operation in the current instruction and the particular functional operation is put in a subsequent instruction. A NOP does not change the status of the control logic and hence, does not contribute to the result of the executable file being executed. The control logic in a VLIW machine merely unloads the predetermined number of operations (including functional operations and NOPs) from the I-cache and executes them in a single processor clock cycle without checking for data precedence constraints.

Due to the addition of NOPs, the size of the resulting executable file in a VLIW computer system is larger than an executable file containing only functional operations. This increase in size wastes main memory space and subsequently I-cache space when the retrieving logic retrieves instructions from main memory.

The addition of NOPs may also require the processor to make more accesses of main memory. The processor causes the control logic to execute instructions stored in the I-cache. If an instruction is not in the I-cache (i.e., an I-cache miss), the processor causes the retrieving logic to access main memory to retrieve the instruction. Generally, a cache line or predetermined amount of data is retrieved from main memory which may include many instructions. The retrieved instructions which may include NOPs are stored in the I-cache. The I-cache of a processor is typically considerably smaller than main memory, and therefore, multiple transactions, each of which will retrieve a cache-line of data, may need to be initiated with main memory to retrieve an entire executable file especially where the executable file has been enlarged by the addition of NOPs.

Thus, the NOPs added to the executable file by the compiler waste I-cache space and may require the processor to make additional main memory accesses to retrieve all the functional operations necessary to accomplish the results desired by the original user program. These additional main memory accesses may degrade the performance of the computer system where other CPUs or devices are resident on the system bus and capable of gaining control of the system bus, but are denied control of the system bus while a CPU conducts the additional main memory accesses.

Another difficulty with VLIW computer systems occurs when new hardware implementations of the CPU are developed such that a different predetermined number of operations may be executed in parallel. Because the control logic in a VLIW computer system relies on the compiler to determine which functional operations may be executed in parallel, user programs must be re-compiled to account for the change in the predetermined number of operations which may be executed in parallel. This also prevents the use of functionally compatible CPUs having different hardware implementations on the same system bus, because they cannot share executable files.

One technique used in VLIW computer systems as an alternative to adding NOPs to the instructions in main memory is for the compiler program to translate a user program into an executable file including only functional operations and sets of control bits. A set of control bits is associated with each group of operations designated by the compiler to be executed in the same instruction (i.e., same processor clock cycle) and provides information to the retrieving logic on the CPU as to where NOPs should be loaded in the I-cache such that each instruction in the I-cache contains the predetermined operations. This technique may waste less main memory space.

However, the retrieving logic is necessarily made more complicated in that the control bits must be interpreted to properly load the I-cache. Additionally, the addressing of instructions in main memory is made more complex, because each instruction in main memory contains a variable number of operations, and thus, the amount main memory space used to store each instruction is different and must be addressed differently. It may be possible to use a system bus over which a fixed amount of data (i.e., a cache-line of data) is always retrieved from main memory, however in this case, that fixed amount of data may contain a variable number of instructions. The retrieving logic may either automatically retrieve a small amount of data which will contain a maximum number of instructions that the I-cache is always able to store, calculate the address range of an amount of data which will contain a number of instructions that the I-cache is currently able to store, or drop that portion of the data which is retrieved but which the I-cache cannot store (i.e., the data is still available in main memory, but not stored in the I-cache). In either of these cases, memory bandwidth may be degraded. This technique also does not solve the waste of I-cache space.

A superscalar parallel processing computer system uses hardware (i.e., control logic) to determine which functional operations may be executed in parallel. A compiler program is used to translate a user program into an executable file, however, the compiler need not determine which functional operations may be executed in parallel. Thus, if the compiler does not determine which functional operations may be executed in parallel, only functional operations necessary for the user program will be stored in main memory and subsequently stored in the I-cache of a CPU. As the control logic unloads functional operations from the I-cache in order to provide an instruction to be executed in the next processor clock cycle, the control logic determines whether there are data precedence constraints such that the functional operation must be executed in a subsequent instruction (i.e., processor clock cycle).

To improve performance a compiler program which checks for data precedence constraints may be used with a superscalar computer system. Since the control logic is generally only capable of examining a small window of operations to determine data dependency, a compiler program which examines considerably more functional operations or the entire program can be used to increase superscalar computer system performance. Thus, the compiler program translates the user program into an executable file with functional operations stored so as to increase the number of operations which the control logic will permit to execute in parallel. Due to the data precedence checking conducted by the control logic, the compiler may, but need not include NOPs, therefore, less main memory and I-cache space is wasted and user programs do not have to be re-compiled to be used on new hardware implementations.

However, the control logic for such a superscalar computer system is necessarily complex and requires a large amount of hardware to implement. Further, the data precedence determination made while unloading functional operations which will make up the next instruction from the I-cache generally consumes a significant amount of time. Thus, the processor clock cycle time period may need to be increased to allow for data precedence checking of operations being unloaded from the I-cache before the instruction is executed where one instruction is executed during each processor clock cycle (i.e., pipe depth equals one) or the number of clock cycles required to execute an instruction may be increased to allow for one or more clock cycles for unloading the operations from the I-cache and checking for data precedence constraints (i.e., pipe depth is greater than one). In either case, the performance of the computer system is reduced.

Another difficulty with superscalar computer systems is limited data lifetime. The control logic will not allow register values to be used for multiple purposes during single processor clock cycles. For example, the control logic will not allow the parallel execution of one functional operation which seeks to store a new value in a register with another functional operation which seeks to use the current value of the same register. The control logic in this situation would incorrectly determine a data precedence constraint.

As an example, if a portion of an executable file contains a multiplication operation (i.e., MUL1) and a subsequent subtraction operation (i.e., SUB1) and SUB1 is to operate on the current value being stored in a register five (i.e., R5) prior to the result of MUL1 being stored in R5, upon making this determination, the compiler program of a VLIW computer system will properly provide both SUB1 and MUL1 in a single instruction (i.e., IN1). Thus, when the control logic of the VLIW computer system executes IN1 without checking for data precedence constraints, SUB1 will operate on a current value of R5 and then MUL1 will load R5 with a new value. The control logic of a superscalar computer system limits the data lifetime of register values and would determine incorrectly that SUB1 needs to operate on the value stored in R5 by the MUL1 operation, and therefore, the control logic would not execute the SUB1 operation in IN1, but rather, in a subsequent instruction. Thus, the SUB1 operation would incorrectly operate on the value stored in R5 by MUL1.

One approach to allow the superscalar computer system to correctly execute the user program would be to have the result of the MUL1 operation stored in another register. However, this could increase the number of necessary registers.

SUMMARY OF THE INVENTION

In accordance with the present invention, an apparatus includes means for storing an executable file where the executable file includes a groups of bits which define functional operations and corresponding cycle bits associated with each functional operation. The apparatus further includes means for completing a variable number of the functional operations in the executable file during a single execution cycle in accordance with a state of the associated cycle bit. With such an arrangement, a minimum amount of control logic is necessary to complete execution of executable files. The cycle bits minimize the necessity of adding null operations (NOPs) to executable files which reduces the amount of storage space necessary to store the executable files. The arrangement also allows executable files to be used on multiple hardware implementations and for register values to be used for multiple purposes during single execution cycles. Overall, the arrangement may allow for increased computer system performance.

In accordance with a further aspect of the invention, a method for instruction execution in a computer system includes the steps of storing an executable file, the file including a groups of bits which define functional operations and corresponding cycle bits associated with each functional operation and completing each functional operation in accordance with a state of the associated cycle bit such that a variable number of functional operations are completed in parallel during a single execution cycle. With such an arrangement by providing cycle bits which control completion of operations, the necessity of adding null operations (NOPs) to executable files is eliminated. This provides a method of execution which reduces the amount of storage space necessary to store the executable files and reduces the amount of control logic necessary to complete execution of the executable files. The method also allows executable files to be used on multiple hardware implementations and for register values to be used for multiple purposes during single execution cycles.

In accordance with a further aspect of the invention, a method of converting a user program into an executable file includes the steps of providing operations associated with functions called for in the user program, assigning resources to the operations, and determining data precedent constraints among the operations. The method further includes the steps of providing a cycle bit associated with each operation and assigning a state to each cycle bit in accordance with the determined data precedent constraints. With such an arrangement, when converting a user program into an executable file, a technique is provided for checking for data dependencies among the operations required by a user program and indicating the determined data dependencies in the executable file by associating a cycle bit with each operation in the executable file in accordance with the determined data dependencies. Thus, the need for complex data dependency checking hardware in a computer system which executes the executable file is eliminated. This may allow for a minimum processor clock cycle time period to be used by a computer system executing the executable file.

BRIEF DESCRIPTION OF THE DRAWINGS

FIG. 4A is a diagram showing parts of a complier in accordance with the present invention;

DETAILED DESCRIPTION OF THE PREFERRED EMBODIMENTS

The invention involves a method and apparatus for employing a cycle bit with each functional operation in an executable file. The invention allows for the completion of a variable number of functional operations in a single processor clock cycle using a minimum amount of control logic and storage space. The use of a cycle bit improves computer system performance by having a compiler determine data dependencies while eliminating the need to add null operations (NOPs) to the executable file, and by eliminating the need for complex data dependency checking hardware. The invention also allows executable files to be used on multiple hardware implementations and for register values to be used for multiple purposes during single processor clock cycles.

Figure 1:
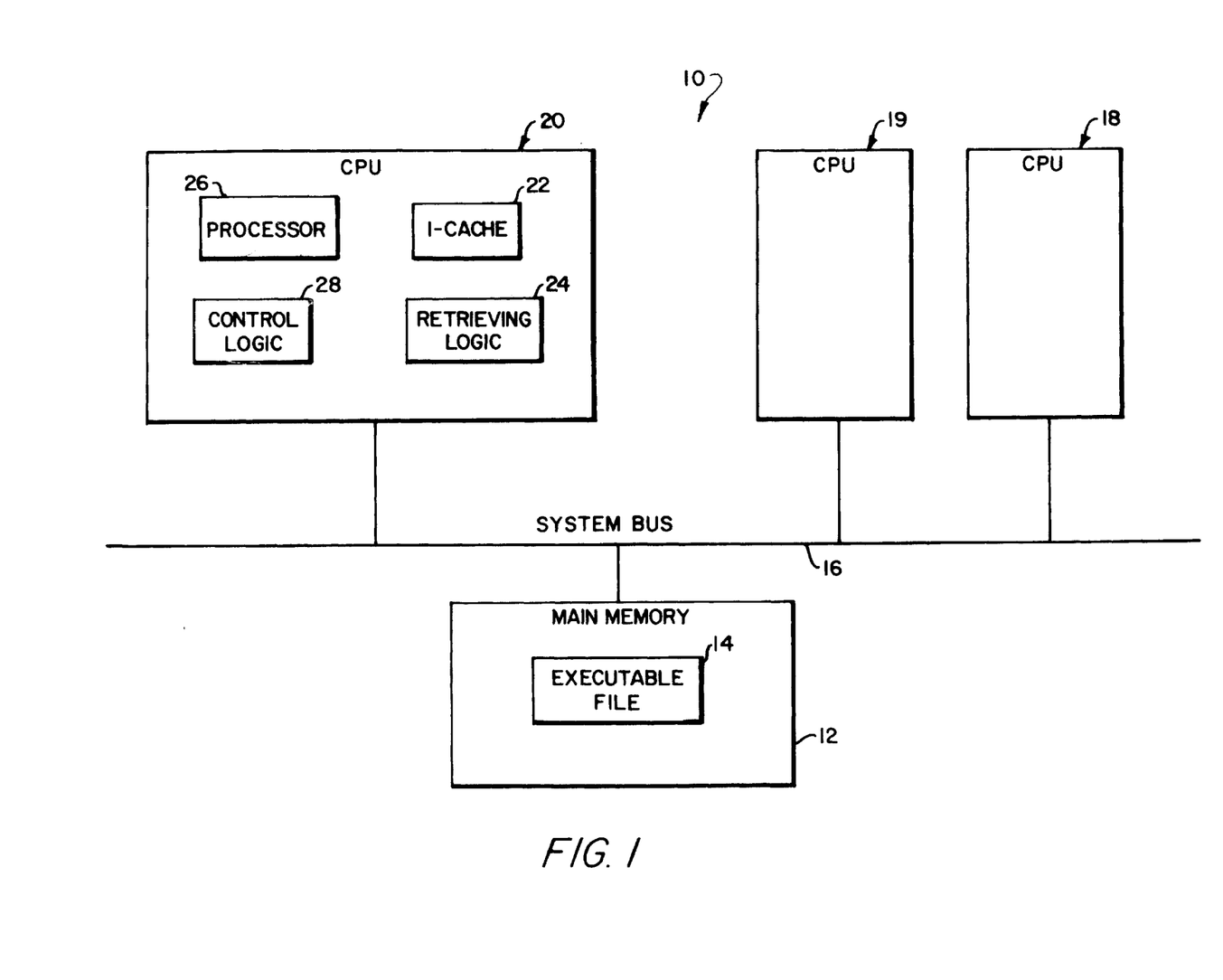
FIG. 1 is a block diagram of a computer network having a system bus coupled to multiple CPUs and main memory.

Referring now to FIG. 1, a computer network 10 is shown to include a main memory 12 which contains an executable file 14 and which is connected to a system bus 16 which couples the main memory to multiple central processing units (CPU) 18, 19, and 20. Although multiple CPUs are shown, the invention may also be used in a single CPU computer system. CPU 20 is shown in more detail to include a cache memory (I-cache) 22, retrieving logic 24, processor chip 26, and control logic 28. It should be understood that a cache memory need not be used in order to derive the benefits of the invention. However, in the preferred embodiment, a cache memory will be employed to further increase the performance of the computer system. It should also be understood that CPU 18 and CPU 19 contain similar or identical hardware (not shown) as CPU 20.

I-cache 22 is used to temporarily store portions of executable files, for example executable file 14, such that processor 26 may cause control logic 28 to execute operations contained therein. When the processor 26 requires access to an operation not currently located in I-cache 22, retrieving logic 24 retrieves the required operation and generally a predetermined number of other operations (i.e., a cache line of data) from main memory 12. The control logic 28 unloads operations in preparation for their execution.

A compiler (i.e., software program) compiles a user program into an executable file 14 which is then stored in main memory 12. The compiler determines all data precedent constraints and provides an executable file 14 which includes only functional operations and a cycle bit associated with each functional operation to indicate data precedent constraints. The functional operations are not grouped into instructions.

The retrieving logic 24 retrieves operations and associated cycle bits located in executable file 14 and loads the operations and cycle bits into the I-cache 22 regardless of the state of the cycle bits. Addressing the operations in main memory is uncomplicated and a system bus which implements transferring a cache-line of data with main memory is here used, because each operation and associated cycle bit is stored in an identical amount of main memory space (i.e., the operations are at fixed locations in main memory relative to each other). The control logic 28 unloads the functional operations from I-cache 22, and the functional operations are completed according to the state of the cycle bit, as will be further described below.

The compiler generally is divided into two components, a front-end and a scheduler. The front-end generates intermediate code which includes "abstract" operations which are operations not yet associated with particular computer system resources, for example, registers. The scheduler uses the results of the front-end to determine data precedent constraints, as described above, and to tie abstract operations to resources to form the operations which provide the executable file 14. A complex scheduler looks at latency considerations as well as system resources when determining data precedent constraints.

Figure 2:
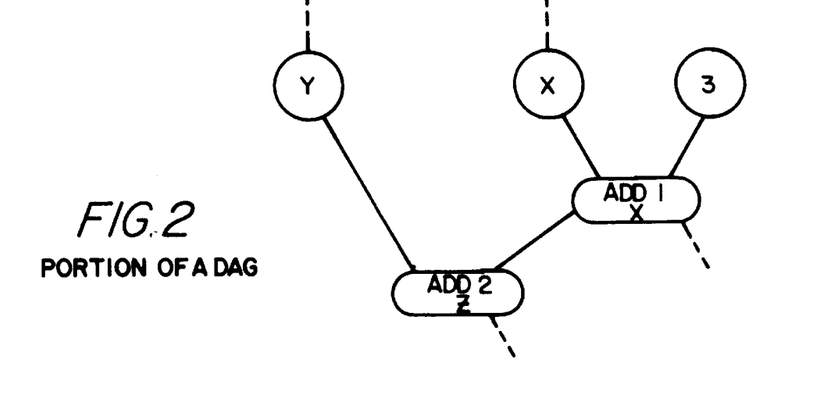
FIG. 2 is a portion of Directed Acyclic Graph (DAG)

Referring now to FIG. 2, a portion of a Directed Acyclic Graph (DAG) is shown. A DAG is a graphical representation of the results of the front-end operation of a typical compiler and shows the data dependencies of each operation determined by the front-end to be necessary to embody the user program. The DAG of FIG. 2 shows that the input operands of an ADD1 operation are X, which may be the result of a previous operation, and a constant equal to three, and that the result of ADD1 should be stored in X. The DAG of FIG. 2 further shows that the input operands of an ADD2 operation are Y, which may be the result of a previous operation, and X and that the result should be stored in Z. As mentioned above, the operations depicted by the DAG are abstract operations in that they are not tied to particular system resources (i.e., registers which may be used to store operands and results of operations).

From the DAG of FIG. 2, a scheduler portion of the compiler determines that ADD2 has a data precedent constraint associated with ADD1, because ADD2 is to operate on the results of ADD1. Thus, in addition to associating the abstract operations with particular computer system resources, the scheduler asserts or deasserts the cycle bits associated with the two operations in such a way as to indicate that ADD2 should be completed in a subsequent processor 26 clock cycle to the processor 26 clock cycle in which ADD1 is completed.

By way of example, an asserted cycle bit will be used by the scheduler to indicate that the associated operation is the last functional operation which may be completed in a processor clock cycle (i.e., execution cycle). Thus, an asserted cycle bit indicates that the following operation has a data precedent constraint based on one or more of the previous operations. This is only by way of example and it will be understood by one skilled in the art that the control logic 28 could be designed to determine that a deasserted cycle bit indicates that the operation is the last functional operation to be completed in a processor clock cycle or the first functional operation to be completed in a subsequent processor clock cycle.

Thus, referring back to FIG. 2, the scheduler would assert the cycle bit associated with ADD1 to indicate that this is the last operation to be completed in a processor clock cycle. This will have the effect of causing ADD2 to be completed in a processor clock cycle subsequent to the processor clock cycle in which ADD1 is completed.

Figure 2A:
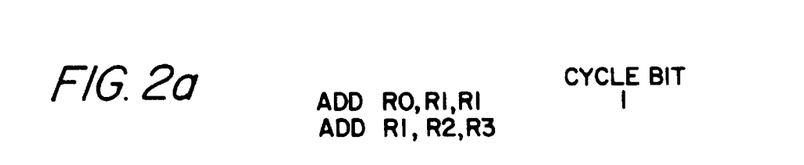
FIG. 2a is a diagram of a result of a scheduler using the DAG of FIG. 2.

A result of the scheduler using the DAG of FIG. 2 is shown in FIG. 2*a*. Here, the scheduler has associated the constant three with register R0, X with register R1, Y with register R2, and Z with register R3. Hence, the first operation (i.e., ADD1) in FIG. 2*a* indicates that the contents of R0 (i.e., three) will be added to the contents of R1 (i.e., X) and the result will be stored in R1. The second operation (i.e., ADD2) of FIG. 2*a* indicates that the contents of R1 will be added to the contents of R2 (i.e., Y) and stored in R3 (i.e., Z). As also shown in FIG. 2*a*, the cycle bit associated with the first operation is asserted to indicate that it is the last operation which should be completed in a processor clock cycle which reflects the data precedent constraint on the second operation which was determined by the scheduler. The state of the cycle bit of the second operation would depend on the other subsequent operations represented in the entire DAG of which only a portion was shown in FIG. 2. Thus, the cycle bit of the second operation is left blank (i.e., unknown) in FIG. 2*a*.

If the scheduler determines that there is a computer system resource problem, it may schedule the operation (not shown) which provides Y such that it is completed in the same processor clock cycle as ADD1 instead of prior to ADD1. In order to accomplish this, the scheduler would assert the cycle bit associated with the last operation to be completed in the prior processor clock cycle.

Figure 3:
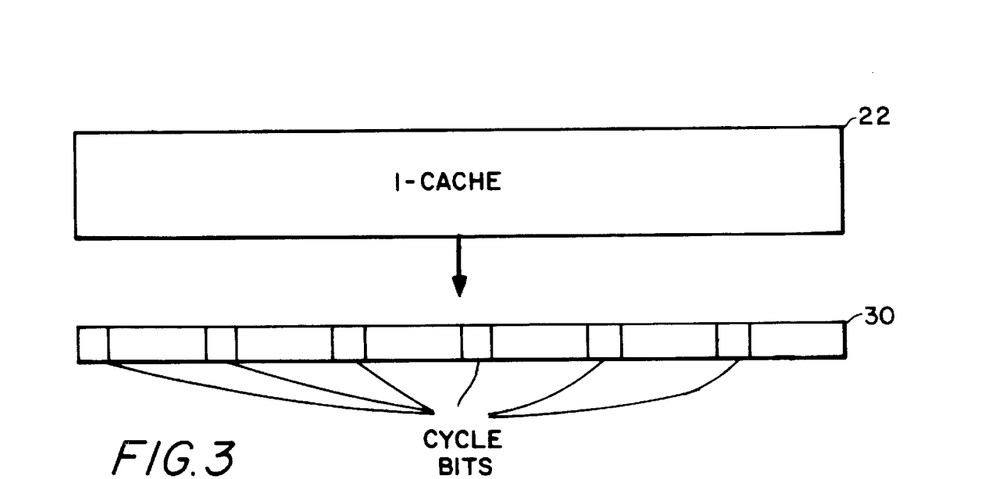
FIG. 3 is a block diagram of an arrangement of an I-cache and an I-reg.

Referring now to FIG. 3, an instruction register (I-reg) 30 is shown associated with I-cache 22. The control logic 28 (shown in FIG. 1) loads operations and associated cycle bits stored I-cache 22 into I-reg 30 in preparation for execution. As shown in FIG. 3, I-cache 22 is configured such that one access of I-cache 22 provides a sufficient number of operations and cycle bits to fully load I-reg 30 (i.e., parallel unloading).

Figure 4:
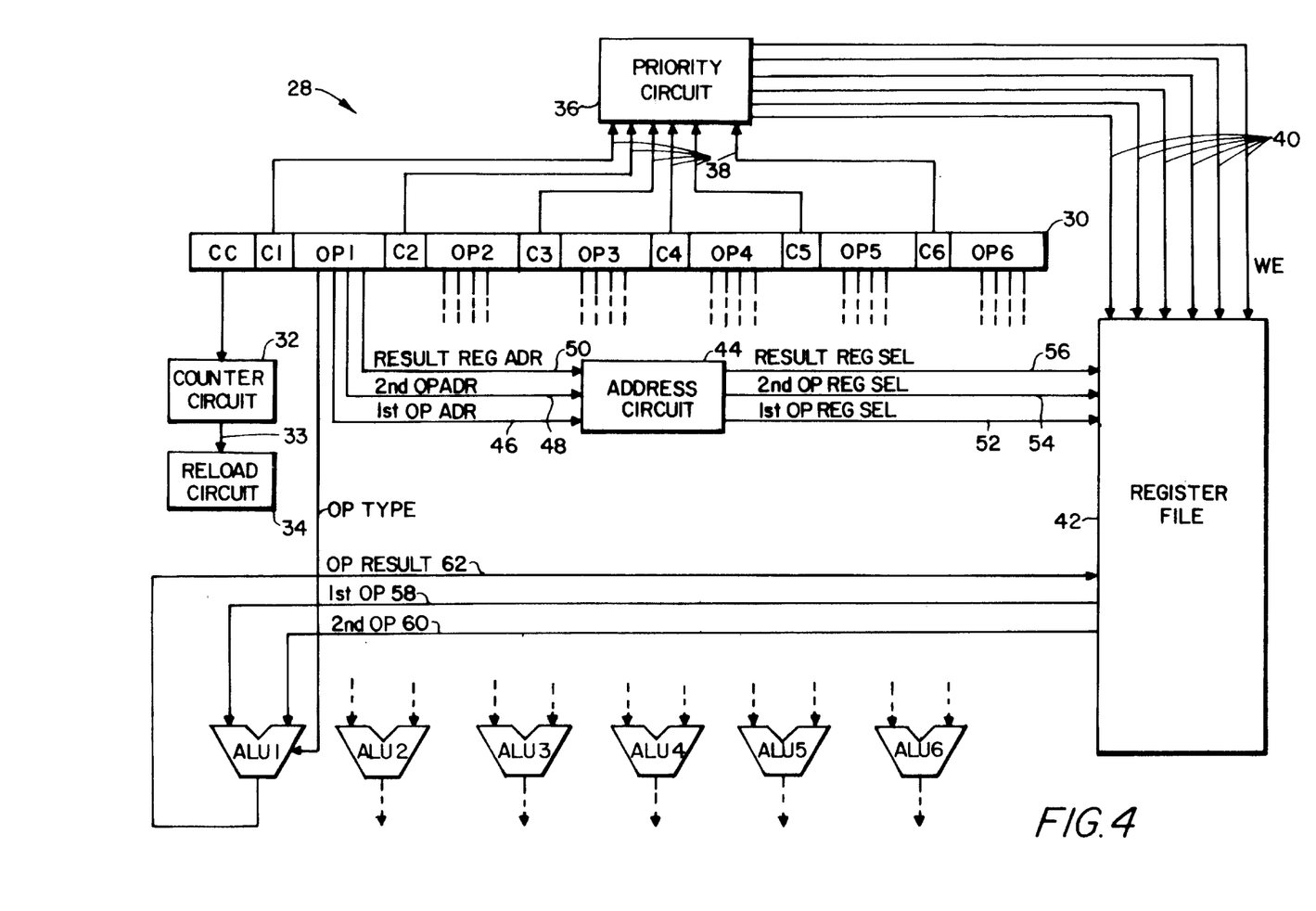
FIG. 4 is a block diagram of control logic circuitry.

Referring now to FIG. 4, a more detailed diagram of control logic 28 is shown including I-reg 30. By way of example, I-reg 30 is shown to be capable of storing six operations (i.e., OP1, OP2, OP3, OP4, OP5, OP6) and six associated cycle bits (i.e., C1, C2, C3, C4, C5, C6). Thus, the invention, the CPU 20 (shown in FIG. 1) is capable of executing six operations in parallel. I-reg 30 is further shown to include a cycle bit count (i.e., CC) which is shown connected to counter circuit 32 which is connected to reload circuit 34.

As shown in FIG. 4, priority circuit 36 is coupled to cycle bit lines 38 which provide priority circuit 36 with the state of the cycle bits C1, C2, C3, C4, C5, C6 stored in I-reg 30 and to write enable lines 40 which provide write enable signals to register file 42. Register file 42 is comprised of a plurality of registers (not shown) and combinational logic (not shown).

An address circuit 44 is coupled to I-reg 30 such that address information in each operation, OP1, OP2, OP3, OP4, OP5, OP6, stored in I-reg 30 is made available to address circuit 44. Address circuit 44 decodes the address information from each operation and provides address select signals on lines 52, 54 and 56 to register file 42. The address information provided by each operation includes three sets of address lines to address circuit 44; an address of a register in register file 42 which contains a first operand (i.e., 1st OP ADR 46), an address of a register in register file 42 which contains a second operand (i.e., 2nd OP ADR 48), and an address of a register in register file 42 in which the result of the operation should be stored (i.e., Result REG ADR 50). To simplify the drawing, only connections for the first operation, OPI, are shown. However, the 1st OP ADR, 2nd OP ADR, and Result REG ADR lines for each of the remaining five operations would likewise be connected to address circuit 44. Address circuit 44 is also shown to be connected to register file 42 and provides three register select lines for each of the operations stored in I-reg 30 including the register containing the first operand (i.e., 1st OP REG SEL 52), the register containing the second operand (i.e., 2nd OP REG SEL 54), and the register in which the result of the operation should be stored (i.e., Result REG SEL 56).

Register file 42 is also connected to six arithmetic logic units (i.e., ALU1, ALU2, ALU3, ALU4, ALU5, ALU6). To simplify the drawing, only connections associated with OP1 and ALU1 are shown. However, there are similar connections associated with ALU2 and OP2, ALU3 and OP3, ALU4 and OP4, ALU5 and OP5, and ALU6 and OP6. The number of ALUs is equal to the number of operations which the CPU 20 (shown in FIG. 1) is capable of executing in parallel. Each operation provides its associated ALU with the operation type. In FIG. 4, OP1 is shown to provide ALU1 with the operation type on the OP Type 64 lines.

The contents of the register containing the first operand for OP1 are provided on the 1st OP 58 lines to one input of ALU1, the contents of the register containing the second operand for OP1 are provided on the 2nd OP 60 lines to a second input of ALU1, and the result of OP1 are provided by ALU1 to the register designated to store the result on the OP Result 62 lines. Similar lines connect each ALU to register file 42.

Reload circuit 34 fully loads I-reg 30 and all operations OP1, OP2, OP3, OP4, OP5, OP6 are completed according to the states of the associated cycle bits C1, C2, C3, C4, C5, C6 prior to reload circuit 34 loading new operations into I-reg 30. Counter circuit 32 is loaded with the value in cycle bit count CC of I-reg 30 when reload circuit 34 loads I-reg 30 with new operations. Cycle bit count CC is equal to the number of cycle bits C1, C2, C3, C4, and C5 which are asserted in I-reg 30.

As described above, an asserted cycle bit indicates that the associated operation is the last operation to be completed in a processor clock cycle. Thus, it is irrelevant if cycle bit C6 is asserted, because in the preferred embodiment as described above, OP6 will always be the last operation in a processor clock cycle to be completed and then reload circuit 34 will load I-reg 30 with new operations. If C1, C2, C3, C4, and C5 are deasserted, then all six operations will be executed and completed in parallel regardless of the state of C6.

After every processor 26 clock cycle, the counter circuit 32 checks the loaded cycle bit count CC, and if the loaded cycle count CC equals zero, then the counter circuit 32 sends a signal 33 to reload circuit 34 which causes reload circuit 34 to load new operations into I-reg 30 from I-cache 22. If the loaded cycle bit count CC does not equal zero, then the counter circuit 32 decrements the loaded cycle bit count CC value by one and waits for the next processor clock cycle to re-check the value. This allows a variable number of the operations loaded into I-reg 30, up to a maximum of six, to be completed during each processor clock cycle according to the state of the associated cycle bit prior to reload circuit 34 loading new operations.

The priority circuit 36 examines the cycle bits C1, C2, C3, C4, and C5 in sequential order to determine which operations OP1, OP2, OP3, OP4, OP5, OP6 may be completed in parallel and then asserts the proper write enable signals 40. The write enable signals 40 are used in combination with the Result REG SEL 56 lines to select the registers in register file 42 designated to store the results of operations to be completed in parallel in the next processor clock cycle.

The cycle bit count CC may be provided by the compiler and stored in main memory 12 or may be provided by retrieving logic 24 when retrieving operations from main memory, or the control logic may provide the cycle bit count CC when unloading operations from I-cache 22.

Preferably, the compiler does not provide the cycle bit count CC, because this limits the use of the executable file to the current hardware implementation (i.e., the executable file would have to be recompiled to be used on a new hardware implementation which is capable of executing more or less than six operations in parallel). If the retrieving logic 24 provides the cycle bit count CC, the size of the I-cache 22 is increased in order to store the CC value. Alternatively, the control logic 28 could provide the cycle bit count CC.

Address circuit 44 is comprised of combinational logic (not shown) and accepts three addresses from each operation in I-reg 30 as described above. Address circuit 44 decodes the addresses provided by the six operations and then asserts the appropriate select lines to the addressed registers (not shown) in register file 42. The select lines are asserted regardless of the state of the cycle bits associated with each operation. Thus, each register designated as storing an operand for a particular operation will be selected (i.e., 1st OP REG SEL 52 and 2nd OP REG SEL 54 will be asserted to the appropriate register) and its contents will be driven over 1st OP 58 lines or 2nd OP 60 lines to the appropriate ALU inputs. Each register designated for storing the result of an operation will have its inputs driven by the appropriate ALU output on OP Result 62 lines.

Thus, each ALU executes the operation type provided by each operation in I-reg 30 over the OP Type 64 lines during each processor 26 clock cycle using the inputs provided from the registers in register file 42 and driving the output to a designated register in register file 42. However, as previously mentioned, the result will not actually be loaded into the result register (i.e., the operation will not actually be completed) unless the write enable signal 40 is also asserted. This prevents operations which correctly loaded designated result registers (i.e., the write enable 40 lines for those registers were asserted by the priority circuit 36) in a previous processor 26 clock cycle from further altering the contents of the designated result registers in a subsequent processor 26 clock cycle, and the contents of designated result registers associated with operations to be executed in subsequent processor 26 clock cycles are similarly prevented from being altered during previous processor 26 clock cycles. Thus, a maximum number of operations will execute in parallel during each processor clock cycle or execution cycle, while only a variable number of operations will actually complete in accordance with the associated cycle bits during each processor clock cycle.

Figure 5:
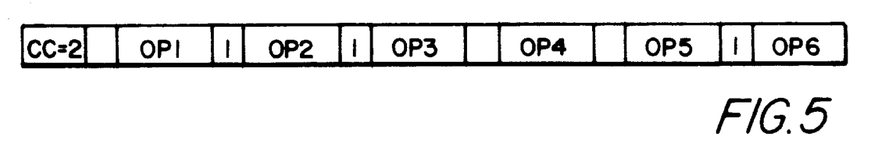
FIG. 5 is a block diagram of an I-reg.

For example, if I-reg 30 is loaded with operations as shown in FIG. 5, address circuit 44 would decode the three addresses sent from each of the six operations on the 1st OP ADR 46 lines, the 2nd OP ADR 48 lines, and the Result REG ADR 50 lines and accordingly assert the proper register select lines to register file 42 on the 1st OP REG SEL 52 lines, the 2nd OP REG SEL 54 lines, and the Result REG SEL 56 lines. The registers selected through the 1st OP REG SEL 52 lines and the 2nd OP REG SEL 54 lines would drive their contents on the 1st OP 58 lines and 2nd OP 60 lines respectively to the appropriate ALU. The Result REG SEL 56 lines are used by combinational logic within register file 42 (not shown) to direct the outputs of the ALUs on the OP Result 62 lines to the inputs of the appropriate result registers.

Where the cycle bits associated with OP2, OP3, and OP6 (i.e., C2, C3, and C6) are asserted as shown in FIG. 5, then the cycle bit count CC loaded into counter circuit 32 would equal two. The priority circuit 36 would assert the write enable 40 lines associated with OP1 and OP2 during the first processor 26 clock cycle after loading I-reg 30 such that although all six operations would be executed in parallel during the first processor clock cycle, only the results of ALUL and ALU2 would be loaded into the result registers designated by OP1 and OP2 (i.e., only OP1 and OP2 would complete). The counter circuit 32 would then examine the loaded cycle bit count CC and determine that it was no zero (i.e., two) and subtract one.

The priority circuit 36 would then assert the write enable 40 line associated with OP3 during the next processor 26 clock cycle such that again although all six operations would be executed in parallel during the next processor clock cycle, only the result of ALU3 would be loaded into the result register designated by OP3 (i.e., only OP3 would complete). The counter circuit 32 would again examine the loaded cycle bit count CC and determine that it was not zero (i.e., one) and subtract one again.

The priority circuit 36 then asserts the write enable 40 lines associated with OP4, OP5, and OP6 during the next processor 26 clock cycle such that only the results of ALU4, ALU5, and ALU6 would be loaded into the result registers designated by OP4, OP5, and OP6 (i.e., only OP4, OP5, and OP6 would complete). In this embodiment of the invention, it is irrelevant that C6 is asserted, because there are no subsequent operations in I-reg 30 to execute in parallel with OP6. The counter circuit 32 would again examine the loaded cycle bit count CC and this time determine that it is zero. The counter circuit 32 would then assert line 33 to cause reload circuit 34 to load six new operations into I-reg 30 from I-cache 22.

During operation of a computer having a program complied in accordance with the invention, the computer program executes in the computer system 10 (FIG. 1). The memory 12 stores the executable file which includes a plurality of groups of bits defining a plurality of functional operations and a corresponding plurality of cycle bits associated with a corresponding one of said operations. The cycle bits are provided from the complier 60 (FIG. 4A) and as mentioned above, the instructions are executed and completed in accordance with a state of said associated cycle bits such that a variable number of said plurality of functional operations are completed in parallel during a single execution cycle, as mentioned in conjunction with FIG. 4.

As shown in FIG. 4A complier 60 converts a user program into an executable file by providing a plurality of operations associated with functions called for in said user program 62 and assigns resources to said plurality of operations 64 in a known manner. The complier 60 determines 66 from said plurality of operations data precedent constraints among said plurality of operations and provides 68 a cycle bit associated with each of said plurality of operations. The complier 60 assigns 69 a state to said cycle bits in accordance with said determined data precedent constraints. The cycle bit is used during execution of the file by the processor to determine whether or not instructions following that instruction can complete execution as mentioned above.

By having the compiler determine data precedence constraints, the need to have complex hardware resident on the CPU to determine data precedent constraints is eliminated. The system performance of the computer system is therefore not affected by the time which would be required for hardware to check data dependencies which may have otherwise forced the processor 26 clock cycle time to be longer.

Further, since the compiler provides a cycle bit with each functional operation to indicate data precedence constraints, the necessity of placing NOPs in executable files is minimized. Hence, in general, less space is required to store executable files in main memory and cache memory, and more functional operations will be retrieved from main memory with each access of main memory. This should improve system performance by requiring less accesses of main memory where such additional accesses may otherwise have temporarily prevented other CPUs from accessing main memory or other devices from accessing the system bus and thus, degrading the overall system performance.

The invention does not prevent the compiler from adding NOPs to the executable file, and under certain circumstances the addition of NOPs may increase file execution efficiency. For example, in regard to timing, the latency involved with the execution of a first operation may cause the compiler to add NOPs in order to delay the execution of a second operation which will use the results of the first operation. As another example, the compiler may add NOPs to pad the executable file where it may be more efficient to execute less then the maximum number of functional operations in a single processor clock cycle.

Also by having the compiler provide a cycle bit with each functional operation in an executable file, the necessity for the compiler to schedule operations into instructions (i.e., schedule only operations to be completed in certain processor clock cycles) is eliminated. Thus, a file compiled for one hardware implementation which is capable of executing a certain maximum number of operations in parallel may be used on another hardware implementation which is capable of executing a different maximum number of operations in parallel. For example, a hardware implementation may be improved to allow for a larger maximum number of operations to be executed per processor clock cycle than the previous version of the hardware implementation. Associating one cycle bit with each operation allows the control logic to unload any number of operations from the I-cache and then use the individual cycle bits to determine which operations may be completed in parallel. There is no need to recompile the user program for use on the new hardware implementation. Also, hardware implementations which are functionally equivalent but which are capable of executing a different maximum number of operations per processor clock cycle may be used simultaneously on the same system bus, because they may use the same executable files.

The data lifetime of register values (i.e., the use of register values for multiple purposes during single processor clock cycles), as discussed above, is also increased by having the compiler check for data precedence constraints. The contents of a register may be used by multiple operations in the same processor clock cycle and the results of one of the operations in the same clock cycle may provide a new value to be stored in the same register provided the cycle bits associated with each operation are asserted/deasserted properly. Again, the cycle bits allow the increase in data lifetime to be carried across multiple hardware implementations.

Although the preferred embodiments of the invention have been described in reference to specific hardware implementations of the control logic on the CPUs, it will become apparent to one of skill in the art that there are many possible hardware implementations of the control logic.

Referring back to FIG. 4, as mentioned previously, in the preferred embodiment, reload circuit 34 fully loads I-reg 30 with operations and cycle bits from I-cache 22 and does not reload I-reg 30 with new operations until all the operations have been completed according to their cycle bits. Alternative embodiments which may allow for more operations to be completed in parallel during each processor clock cycle by loading new operations in I-reg 30 prior to all of the previously loaded operations being completed may be implemented. The control logic associated with these implementations may be more complex, however, in future generations of integrated circuits where the silicon area permits more complex logic in smaller areas these implementations may be more feasible.

One such implementation involves loading individual subsequent operations from an I-cache into locations in an I-reg which were freed up during the previous processor clock cycle by the completion of the operation previously being stored in those locations. Therefore, a system performance concern would be the amount of time required to unload operations from the I-cache and load the I-reg during a processor clock cycle in which those operations may need to be executed.

Figure 6:
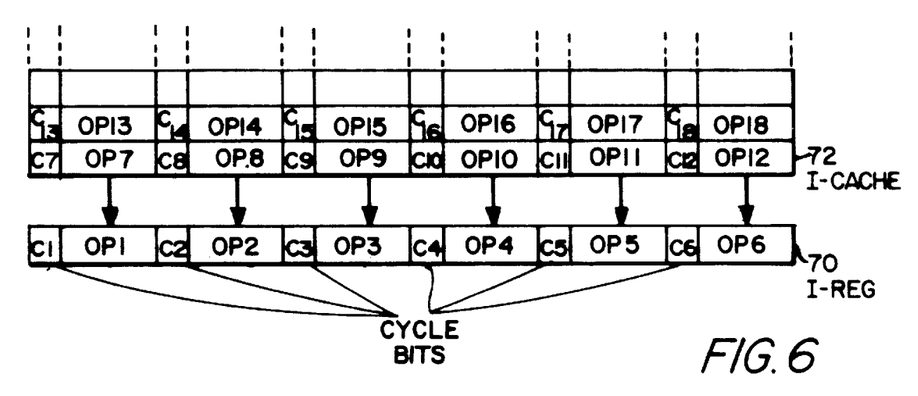
FIG. 6 is a diagram of the order of operations of a particular implementation of control logic circuitry.

Referring to FIG. 6, an I-reg 70 and a portion of an I-cache 72 are shown as well as some of the operations and cycle bits stored therein. In the system just described, if the cycle bits associated with the first six operations (i.e., OP1, OP2, OP3, OP4, OP5, OP6) are deasserted, then, similar to the preferred embodiment described in detail above, all six operation will be completed in parallel (i.e., all six registers designated to store the results of the operations are loaded with the results of the six operations respectively), then the next six operations (i.e., OP7, OP8, OP9, OP10, OP11, OP12) will be loaded into I-reg 70.

However, if the cycle bits associated with OP2, OP5, and OP6 (i.e., C2, C5, C6) are asserted, then result registers designated to store the results of OP1 and OP2 will be loaded with the results of OP1 and OP2, respectively, (i.e., OP1 and OP2 are completed) during the first processor clock cycle following I-reg 70 being loaded and, in this embodiment, OP7 and OP8 from I-cache 72 will then be loaded into I-reg 70 in the locations which previously stored OP1 and OP2. During the second processor clock cycle, the result registers designated to store the results of OP3, OP4, and OP5 will be loaded with the results of OP3, OP4, and OP5, respectively, (i.e., OP3, OP4, and OP5 are completed) and OP9, OP10, and OP11 will be unloaded from I-cache 72 and loaded into I-reg 70 in the locations which previously stored OP3, OP4, and OP5. During the third processor clock cycle, the result register designated to store the results of OP6, OP7, OP8, OP9, OP10, and OP11 will be loaded with the results of those operations, respectively, and I-reg 70 will be loaded with OP13, OP14, OP15, OP16, OP17, and OP12 from I-cache 72 in the locations in I-reg 70 which previously stored OP7, OP8, OP9, OP10, OP11 and OP6, respectively. Thus, instead of only completing OP6 during the third processor clock cycle prior to reloading I-reg 70 as would be the case with the preferred embodiment discussed in detail above, six operations are completed in parallel during the third processor clock cycle. The cycle bits are still examined in a sequential order (i.e., OP7 and OP8 were not executed in parallel with OP3, OP4, and OP5 and prior to OP6). Thus, if the cycle bit associated with OP12 (i.e., C12) were asserted, then in the forth processor clock cycle only the result register designated to store the results of OP12 would be loaded with the results of that operation and OP18 would be loaded into I-reg 70 in the location previously used to store OP12.

Figure 7:
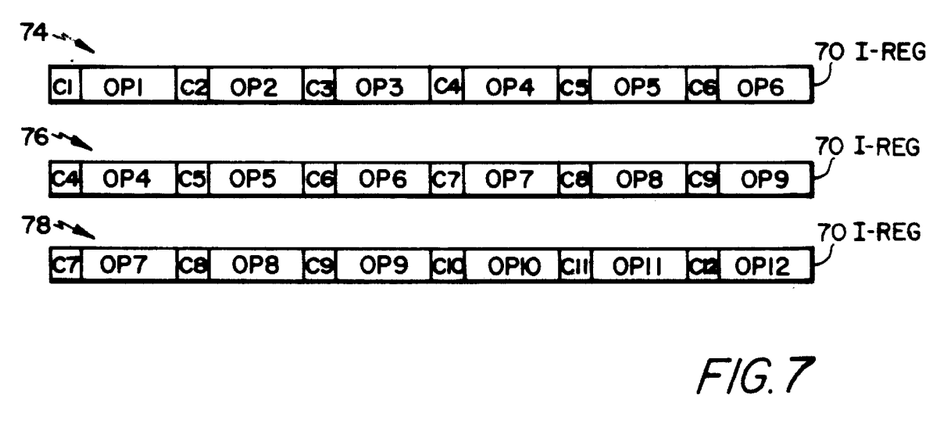
FIG. 7 is a diagram of the order of operations of another particular implementation of control logic circuitry.

Referring to FIG. 7, the contents of an I-reg 70 are shown during three different processor clock cycles (i.e., 74, 76, 78, where 74 represents a first processor clock cycle and 76 and 78 represent a second and third processor clock cycle, respectively). In this embodiment of the invention, operations are serially unloaded from the I-cache and then shifted (in the drawing the operations are shifted to the left) into the I-reg. An I-cache as shown in FIG. 3 may be employed in this embodiment provided an additional register is used which may be parallelly loaded with operations from the I-cache and then directed to shift the operations into the I-reg.

In this embodiment, if the cycle bits associated with OP3 and OP6 are asserted, then the result registers designated to store the results of OP1, OP2, and OP3 will be loaded with the results of those operations, respectively, (i.e., OP1, OP2, and OP3 are completed) during a first processor clock cycle. Then OP4, OP5, and OP6 will be shifted to the left once and OP7 loaded from the I-cache, and then OP4, OP5, OP6, and OP7 will be shifted to the left once and OP8 loaded, and then OP4, OP5, OP6, OP7, and OP8 will be shifted to the left again and OP9 will be loaded, and then the result registers designated to store the results of OP4, OP5, and OP6 will be loaded with the results of those operations, respectively, during the second processor clock cycle.

Again, the operations (i.e., OP7, OP8, OP9) already in the I-reg and not yet executed will be shifted left and new operations (i.e., OP10, OP11, OP12) from the I-cache will be loaded and shifted left as necessary for each operation (i.e., OP4, OP5, OP6) completed during the second processor clock cycle. Thus following the second processor clock cycle, the I-reg fully loaded would be storing OP7, OP8, OP9, OP10, OP11, and OP12 (i.e., 78) and if the cycle bits associated with those operations (i.e., C7, C8, C9, C10, C11, C12) are deasserted, then the six result registers designated to store the results of those operations will all be loaded with the results of those operations during the third processor clock cycle (i.e., all six operations are completed).

Having described preferred embodiments of the invention, it will now become apparent to one of skill in the art that other embodiments incorporating their concepts may be used. Accordingly, it is submitted that the invention should not be limited to the disclosed embodiments, but rather should be limited by the spirit and scope of the appended claims.

What is claimed is:

1. An apparatus comprising:

a compiler for generating an executable file including compound instructions of varying length, at least one compound instruction including multiple operational instructions, each operational instruction including a corresponding cycle bit indicating which of a set of multiple operational instructions can be logically executed simultaneously;

an instruction register including a predetermined number of operational instruction storage slots for storing a predetermined number of operational instructions and corresponding cycle bits;

an instruction fetching unit that, during a fetch cycle, fetches the operational instructions of compound instructions in the executable file and transfers the fetched operational instructions and the corresponding cycle bits to the operational instruction storage slots of the instruction register, the instruction fetching unit overwriting previously executed operational instructions in the instruction register with newly fetched operational instructions and corresponding cycle bits, the instruction fetching unit fetching and storing part of a compound instruction to the instruction register when a compound instruction includes more operational instructions than available operational instruction storage slots in the instruction register, such that any operational instructions of a partially fetched compound instruction not fetched on a current fetch cycle are fetched and stored in the instruction register on one or more subsequent fetch cycles; and an instruction executing unit including multiple processors that, after a fetch cycle, simultaneously execute operational instructions in the instruction register in parallel depending on a state of the corresponding cycle bits, each processor executing an operational instruction in a corresponding operational instruction storage slot, such that any subsequently fetched operational instructions of a partially fetched and executed compound instruction being executed on one or more subsequent processing cycles such that the executable file is properly executed by instruction executing units having fewer processors than a number of operational instructions in a maximal length compound instruction.

2. An apparatus as described in claim 1, wherein execution of the operational instructions following a fetch cycle begin with earlier fetched operational instructions, parallel execution of the compound instructions progressing towards later fetched operational instructions according to corresponding cycle bit settings.

3. An apparatus as described in claim 1, wherein the instruction fetching unit fetches a number of operational instructions from the executable file equal to the predetermined number of operational instruction storage slots and stores them in the instruction register after processing all previously fetched operational instructions in the instruction register.

4. An apparatus as described in claim 1 wherein the instruction register includes a predetermined number of adjacent operational instruction storage slots, execution of the operational instructions following a fetch cycle beginning with earlier fetched operational instructions, parallel execution of the compound instructions progressing towards later fetched operational instructions according to corresponding cycle bit settings, after execution of an earlier fetched compound instruction, any non-executed operational instructions in the instruction register are shifted into operational instruction storage slots of the instruction register that have been previously executed, next available operational instructions in the executable file then being loaded into vacant slots of the instruction register.

5. An apparatus comprising:
a compiler for generating an executable file including compound instructions of varying length, each compound instruction including at least one operational instruction, each operational instruction including a corresponding cycle bit that indicates which of a set of multiple operational instructions can be logically executed simultaneously, wherein a number of operational instructions in a maximum length compound instruction is greater than a number of processors in a multi-processor system that are available to execute at least part of a compound instruction in parallel;
an instruction register including a predetermined number of operational instruction storage slots for storing a predetermined number of operational instructions and corresponding cycle bits;
an instruction fetching unit that, during a fetch cycle, fetches the operational instructions of compound instructions in the executable file and transfers the operational instructions and the corresponding cycle bits to storage slots of the instruction register;
an instruction executing unit including multiple processors that, during an execute cycle, simultaneously execute all or part of a compound instruction in the instruction register in parallel depending on a state of the corresponding cycle bits, each processor executing an operational instruction in a corresponding operational instruction storage slot of the instruction register, any part of a compound instruction not fetched and executed during a current processing cycle being fetched and executed on one or more subsequent cycles; and
whereby the executable file can be executed on a plurality of hardware platforms, each hardware platform having a potentially different hardware resource capacity for simultaneously executing operational instructions stored in its respective instruction register.

6. An apparatus as described in claim 5 wherein the instruction register includes a predetermined number of adjacent operational instruction storage slots, execution of the operational instructions following a fetch cycle beginning with earlier fetched operational instructions, parallel execution of the compound instructions progressing towards later fetched operational instructions according to corresponding cycle bit settings, after execution of an earlier fetched compound instruction, any non-executed operational instructions in the instruction register are shifted into operational instruction storage slots of the instruction register that have been previously executed, next available operational instructions in the executable file then being loaded into vacant slots of the instruction register.

7. An apparatus as described in claim 6 wherein the instruction executing unit further comprises:
a plurality of digital processors capable of processing any of the operational instructions, but each of which is assigned to process an operational instruction in a corresponding storage slot of the instruction register, the digital processors processing a number of operational instructions in the instruction register in parallel depending on a state of the corresponding cycle bits.

8. An apparatus as described in claim 6 wherein vacancies in the instruction register storage slots due to shifting of non-executed operational instructions are refilled by fetching next available operational instructions from the executable file and transferring them into newly vacant operational instruction storage slots, further execution of the operational instructions in the instruction register depending on the state of corresponding cycle bit settings.

9. An apparatus as described in claim 5 wherein the instruction register is capable of simultaneously storing multiple compound instructions, each of which is defined by corresponding cycle bits such that operational instructions in the instruction register not executed during a previous processing cycle are executed on one or more subsequent processing cycles according to corresponding operational instruction cycle bit settings.

10. An apparatus as in claim 5 wherein, after completing execution of a compound instruction, the instruction fetching unit fetches new operational instructions and cycle bits and transfers the new operational instructions to refill operational instruction storage slots of any previously executed operational instructions in the instruction register.

11. An apparatus as in claim 5 wherein the instruction register includes a predetermined number of slots for storing operational instructions, each slot assigned to a corresponding digital processor that is to process an operational instruction therein, results of each executed operational instruction being written to a common register file.

12. An apparatus as described in claim 5 wherein the operational instructions in a compound instruction can be executed by any of the processors in the instruction executing unit, the apparatus including an address circuit for decoding address information of the operational instructions stored in the instruction register, the address circuit coupled to a register file that uses decoded address information to access data to be processed by corresponding processors.

13. An apparatus as described in claim 12 wherein results of operational instructions executed in parallel are stored in the register file.

14. An apparatus as described in claim 5 wherein the instruction fetching unit fetches a predetermined number of adjacent operational instructions from the executable file based on a storage capacity of the instruction register and stores the fetched adjacent instructions to corresponding adjacent operational instruction storage slots in the instruction registers.

15. An apparatus comprising:

a compiler for generating an executable file including compound instructions of varying length, each compound instruction including at least one operational instruction and corresponding cycle bit that indicates which of a set of multiple operational instructions can be logically executed simultaneously, wherein a number of operational instructions in a maximum length compound instruction can be greater than a number of processors in a multi-processor system that are to execute at least part of a compound instruction in a given execution cycle;

an instruction register for storing a predetermined number of operational instructions, the predetermined number of operational instructions being less than the number of operational instructions in a maximum length compound instruction, each operational instruction having a corresponding cycle bit that indicates which of the predetermined number of operational instructions can be executed simultaneously;

an instruction fetching unit that fetches the variable length compound instructions from the executable file and stores fetched operational instructions in the instruction register, the instruction fetching unit, at times, fetching part of a compound instruction; and an instruction executing unit including multiple digital processors for simultaneously executing a previously fetched set of operational instructions in the instruction register, any non-executed portion of a partially executed compound instruction being executed on subsequent fetch and execute cycles such that instruction executing units having fewer digital processors than a number of operational instructions in the maximum length compound instruction are capable of executing the same executable file.

16. An apparatus as described in claim 15 wherein the instruction executing unit further comprises:

a plurality of digital processors capable of processing any of the operational instructions, but each of which is assigned to process an operational instruction in a corresponding storage slot of the instruction register, the digital processors processing a number of operational instructions in the instruction register in parallel depending on a state of the corresponding cycle bits.

17. An apparatus as described in claim 15 wherein the instruction register includes a predetermined number of adjacent operational instruction storage slots, execution of the operational instructions following a fetch cycle beginning with earlier fetched operational instructions, parallel execution of the compound instructions progressing towards later fetched operational instructions according to corresponding cycle bit settings, after execution of an earlier fetched compound instruction, any non-executed operational instructions in the instruction register are shifted to operational instruction storage slots of the instruction register that have been previously executed.

18. An apparatus as described in claim 17 wherein vacancies in the instruction register storage slots due to shifting of non-executed operational instructions are refilled by fetching next available operational instructions from the executable file and transferring them into newly vacant operational instruction storage slots, further execution of the operational instructions in the instruction register depending on the state of corresponding cycle bit settings.

19. An apparatus as described in claim 15 wherein the instruction register is capable of simultaneously storing multiple compound instructions, each of which is defined by corresponding cycle bits such that operational instructions in the instruction register not executed during a previous processing cycle are executed on one or more subsequent processing cycles according to corresponding operational instruction cycle bit settings.

20. An apparatus as in claim 15 wherein, after completing execution of a compound instruction, the instruction fetching unit fetches new operational instructions and cycle bits and transfers the new operational instructions to refill operational instruction storage slots of any previously executed operational instructions in the instruction register.

21. An apparatus as in claim 15 wherein the instruction register includes a predetennined number of slots for storing operational instructions, each slot assigned to a corresponding digital processor that is to process an operational instruction therein, results of each executed operational instruction being written to a common register file.

22. An apparatus as described in claim 15 wherein the operational instructions in a compound instruction can be executed by any of the processors in the instruction executing unit, the apparatus including an address circuit for decoding address information of the operational instructions stored in the instruction register, the address circuit coupled to a register file that uses decoded address information to access data to be processed by corresponding processors.

23. An apparatus as described in claim 22 wherein results of operational instructions executed in parallel are stored in the register file.

24. An apparatus as described in claim 15 wherein the instruction fetching unit fetches a predetermined number of adjacent operational instructions from the executable file based on a storage capacity of the instruction register and stores the fetched adjacent instructions to corresponding adjacent operational instruction storage slots in the instruction registers.

25. In a multiprocessor system for simultaneously executing operational instructions of an executable file, an apparatus comprising:

an instruction fetching unit that, during a fetch cycle, fetches the operational instructions from the executable file, the executable file including compound instructions of varying length, each compound instruction including a number of operational instructions that can be executed simultaneously, the executable file including at least one compound instruction having more operational instructions than available processors to execute such instructions simultaneously, the instruction fetching unit fetching part of a compound instruction when a compound instruction includes more operational instructions than available processors to simultaneously execute fetched operational instruction, any operational instructions of a partially fetched compound instruction not fetched on a current fetch cycle being fetched on one or more subsequent fetch cycles; and an instruction executing unit including multiple processors that, after a fetch cycle, simultaneously execute operational instructions fetched from the executable file, any subsequently fetched operational instructions of a partially fetched and executed compound instruction being executed on one or more subsequent processing cycles such that the executable file can be properly executed by instruction executing units having fewer processors than a number of operational instructions in a maximum length compound instruction.

26. A method comprising the steps of:

generating an executable file including compound instructions of varying length, at least one compound instruction including multiple operational instructions, each operational instruction including a corresponding cycle bit indicating which of a set of multiple operational instructions can be logically executed simultaneously, wherein a number of operational instructions in a maximum length compound instruction can be greater than a number of processors in a multi-processor system that are available to execute at least part of a compound instruction in parallel;

storing a predetermined number of operational instructions and corresponding cycle bits in a predetermined number of operational instruction storage slots of an instruction register;

fetching the operational instructions of compound instructions in the executable file and transferring the operational instructions and corresponding cycle bits to storage slots of the instruction register;

simultaneously executing all or part of a compound instruction in the instruction register in parallel depending on a state of the corresponding cycle bits, each processor executing an operational instruction in a corresponding operational instruction storage slot of the instruction register, any part of a compound instruction not fetched and executed during a current processing cycle being fetched and executed on one or more subsequent cycles; and whereby the executable file can be executed on a plurality of hardware platforms, each hardware platform having a potentially different numbers of executing units operating in parallel for simultaneously executing operational instructions in its respective instruction register.

* * * * *

UNITED STATES PATENT AND TRADEMARK OFFICE
CERTIFICATE OF CORRECTION

PATENT NO. : 6,154,828
DATED : November 28, 2000
INVENTOR(S) : Joseph D. Macri, Francis X. McKeen, Joel S. Emer, William R. Grundmann, Robert P. Nix and David A.J. Webb, Jr.

It is certified that error appears in the above-identified patent and that said Letters Patent is hereby corrected as shown below:

Title page, field [54],
Please correct the Title "METHOD AND APPARATUS FOR EMPLOYING A CYCLE BIT PARALLEL EXECUTING INSTRUCTIONS" to read -- METHOD AND APPARATUS FOR EMPLOYING A CYCLE BIT TO INDICATE COMPLETION OF EXECUTION OF PARALLEL EXECUTING INSTRUCTIONS --.

Claim 21,
Line 21, delete "predetennined" and insert -- predetermined --.

Signed and Sealed this

Second Day of October, 2001

*Attest:*

NICHOLAS P. GODICI
*Attesting Officer*    *Acting Director of the United States Patent and Trademark Office*